Patented Oct. 22, 1929

1,732,373

UNITED STATES PATENT OFFICE

ALWIN MITTASCH AND GUSTAV WIETZEL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CATALYTICALLY MANUFACTURING PHOSPHORIC ACID AND HYDROGEN

No Drawing. Application filed November 14, 1925, Serial No. 69,183, and in Germany November 22, 1924.

By the decomposition of phosphorus with steam with or without an admixture of oxygen, phosphoric acid and hydrogen are obtained, but the reaction is only satisfactory when employing an undesirably low speed of the gases or a great excess of steam or both. Besides, owing to the high temperature necessary for carrying out the reaction, lower oxidation products of phosphorus are formed in considerable quantities.

We have now found that by the use of coal as a catalyst, phosphoric acid is obtained rapidly and with excellent yields at relatively low temperatures, for example at 600 degrees centigrade or even lower temperatures. The term "coal" used above is to be understood in a broad sense including any form of amorphous carbon, but porous, non-bituminous coal is best suitable, for example low temperature carbonization coke, or lignite coke (so-called Grude coke), or active carbon prepared by activating natural or artificial coal or charcoals in any suitable manner. The attack of steam on the coal is generally very small at the comparatively low temperatures required for the process. The steam may be mixed with oxygen or air for generating heat; with air, a mixture of nitrogen and hydrogen is obtained which may be utilized for example for the synthesis of ammonia. The phosphoric acid or its anhydrid formed by the process distils off.

The following example will serve to further illustrate how the invention may be carried into practice, but the invention is not limited to this example. The parts are by weight.

4 kilograms of phosphorus are vaporized and mixed with 30 kilograms of steam and the mixture is passed, at about 650 degrees centigrade, over 30 litres of active carbon, prepared by charring wood impregnated with zinc chlorid, as described in the German Patent 290,656. Nearly all of the phosphorus is decomposed with a formation of phosphoric acid and hydrogen. While in the beginning of the operation the gas produced contains considerable admixtures of carbon monoxid and dioxid, these impurities disappear practically completely in the course of the operation and the contact remains active for a great length of time.

The catalytic efficiency of the active carbon or other coal can be further increased in some cases by an addition of catalytically active metals.

We claim:

1. The process of manufacturing phosphoric acid and hydrogen which consists in acting with steam on phosphorus vapor at a temperature between about 500° and 1000° C. in the presence of coal.

2. The process of manufacturing phosphoric acid and hydrogen which consists in acting with steam and a gas containing oxygen on phosphorus vapor at a temperature between about 500° and 1000° C. in the presence of coal.

3. The process of manufacturing phosphoric acid and hydrogen which consists in acting with steam on phosphorus vapor at a temperature between about 500° and 1000° C. in the presence of porous, non-bituminous coal.

4. The process of manufacturing phosphoric acid and hydrogen which consists in acting with steam on phosphorus vapor at a temperature of about 600 degrees centigrade in the presence of porous, non-bituminous coal.

In testimony whereof we have hereunto set our hands.

ALWIN MITTASCH.
GUSTAV WIETZEL.